United States Patent
Stimmel

(10) Patent No.: US 6,678,719 B1
(45) Date of Patent: Jan. 13, 2004

(54) VIRTUAL WORKPLACE INTERCOMMUNICATION TOOL

(75) Inventor: Carol L. Stimmel, Boulder, CO (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/467,872

(22) Filed: Dec. 20, 1999

(51) Int. Cl.$^7$ .............................................. G06F 13/100
(52) U.S. Cl. ........................ 709/204; 709/205; 709/207; 709/219
(58) Field of Search ................................. 709/204, 205, 709/206, 207, 219, 227, 217, 218; 725/106

(56) References Cited

U.S. PATENT DOCUMENTS

| | | | | |
|---|---|---|---|---|
| 5,689,642 A | * | 11/1997 | Harkins et al. ............. | 709/207 |
| 5,761,277 A | * | 6/1998 | Foladare et al. ........ | 379/221.05 |
| 5,764,639 A | | 6/1998 | Staples et al. | |
| 5,784,546 A | | 7/1998 | Benman, Jr. | |
| 5,793,365 A | * | 8/1998 | Tang et al. .................. | 345/758 |
| 5,909,543 A | * | 6/1999 | Tanaka et al. .............. | 709/204 |
| 6,148,328 A | * | 11/2000 | Cuomo et al. .............. | 709/204 |
| 6,163,799 A | * | 12/2000 | Kambayashi et al. ....... | 709/204 |
| 6,212,548 B1 | * | 4/2001 | DeSimone et al. .......... | 709/204 |
| 6,249,806 B1 | * | 6/2001 | Kohda et al. ............... | 709/206 |
| 6,301,609 B1 | * | 10/2001 | Aravamudan et al. ...... | 709/207 |
| 6,389,028 B1 | * | 5/2002 | Bondarenko et al. ....... | 370/401 |
| 6,392,669 B1 | * | 5/2002 | Matoba et al. .............. | 345/751 |
| 6,430,177 B1 | * | 8/2002 | Luzeski et al. ............. | 370/356 |
| 6,430,604 B1 | * | 8/2002 | Ogle et al. .................. | 709/207 |

(List continued on next page.)

FOREIGN PATENT DOCUMENTS

| | | | | |
|---|---|---|---|---|
| GB | 2319135 A | * | 5/1998 | ............ H04M/3/56 |
| WO | WO 99/09658 | * | 2/1999 | |

OTHER PUBLICATIONS

Schwartz, Karen D. "MMCF Laying Groundwork for Multimedia Communications" Multimedia Technology Report, The Gale Group Newsletter DB, Apr. 17, 1995.*
Select pages from Microsoft NetMeeting.*
"AltaVista Debuts 'AltaVista Live!' the Web's First Real-time Personal Megaportal" Business Wire, Oct. 25, 19999.*
Select archived pages from the ICQ Network, Feb. 12, 1998.*

Primary Examiner—Robert B. Harrell
Assistant Examiner—M H P
(74) Attorney, Agent, or Firm—Brooks Kushman P.C.

(57) ABSTRACT

A system and associated method for enabling a user to determine the status of other users and to identify communications procedures for contacting the other users based on the status of the other users. The system includes a plurality of communications devices each associated with a user. Each of the communications devices is operable for the associated user to self assign a user status and communications procedures for contacting the associated user as a function of the user status. Each of the communications devices associated with a user is operable for displaying the user status of the other users. A hybrid fiber coax (HFC) communications network is operable with the communications device for providing continuous communications connectivity of a plurality of users with one another through an Internet. Each of the communications devices associated with a user is operable for displaying the communications procedures associated with the other users for contacting the other users. The communication device associated with a user is operable with the HFC communications network and the communication device associated with another user for enabling the user to select a communication method from the communication methods associated with the another user and then establish a communication connection with the another user based on the selected communications procedure.

14 Claims, 2 Drawing Sheets

U.S. PATENT DOCUMENTS

| | | | |
|---|---|---|---|
| 6,434,599 B1 * | 8/2002 | Porter .......................... | 709/204 |
| 6,442,567 B1 * | 8/2002 | Retallick et al. .......... | 707/104.1 |
| 6,484,196 B1 * | 11/2002 | Maurille ...................... | 709/206 |
| 6,519,639 B1 * | 2/2003 | Glasser et al. .............. | 709/224 |
| 6,526,274 B1 * | 2/2003 | Fickes et al. ............ | 455/414.1 |
| 6,539,421 B1 * | 3/2003 | Appelman et al. .......... | 709/206 |
| 6,549,937 B1 * | 4/2003 | Auerbach et al. ........... | 709/206 |
| 6,557,029 B2 * | 4/2003 | Szymansky ................. | 709/206 |
| 6,563,914 B2 * | 5/2003 | Sammon et al. ....... | 379/202.01 |
| 6,564,244 B1 * | 5/2003 | Ito et al. ..................... | 709/204 |
| 6,564,246 B1 * | 5/2003 | Varma et al. ............... | 709/205 |
| 6,584,494 B1 * | 6/2003 | Manabe et al. ............. | 709/204 |

* cited by examiner

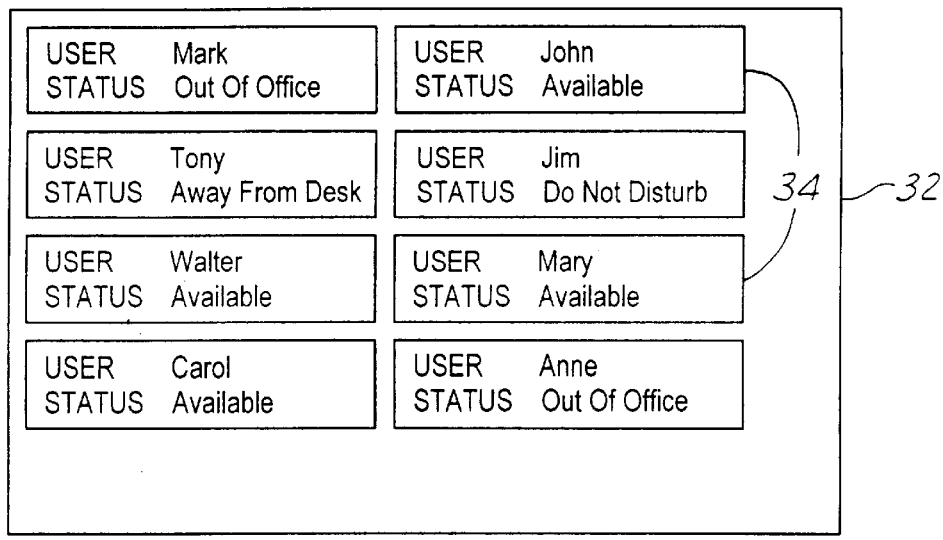
FIG. 2
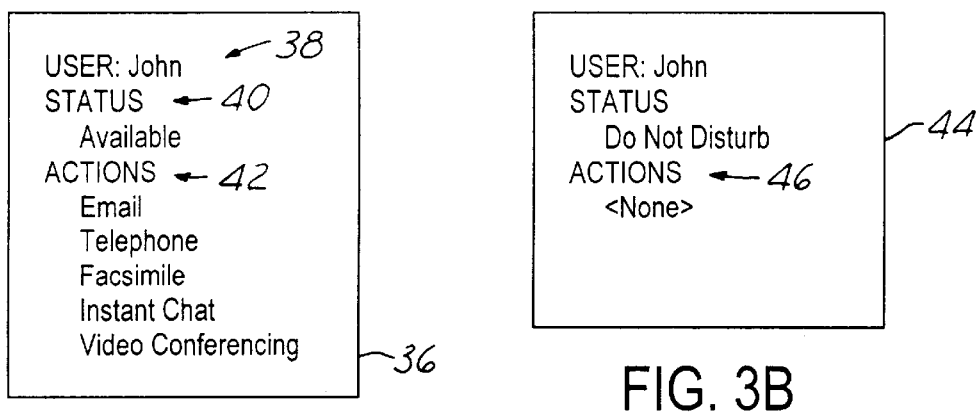
FIG. 3A
FIG. 3B
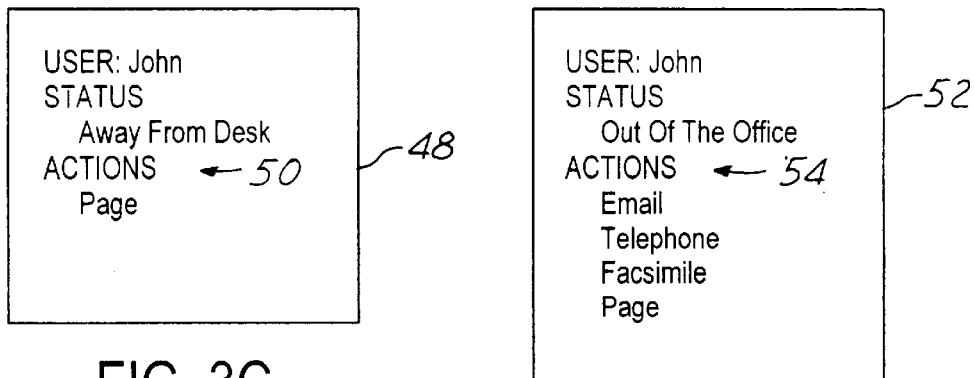
FIG. 3C
FIG. 3D

VIRTUAL WORKPLACE INTERCOMMUNICATION TOOL

TECHNICAL FIELD

The present invention relates generally to a system that leverages the bandwidth in a hybrid fiber coax (HFC) communications network to provide services that address the social impacts related to managing and working with remote workers in an organization.

BACKGROUND ART

Telecommuting is generally advantageous for workers and businesses in matters of sheer productivity. However, there are costs related to the disruption of social relationships. The problems for remote workers include increased social isolation from their peers, less face time with colleagues for problem solving and mentoring, and increased stress due to negative perceptions from on location coworkers.

Today, many businesses and other electronic communities have a hybrid fiber coax (HFC) network in which workers are connected. Many different devices such as computers, set top boxes, telephones, and the like may be used to connect the workers to the HFC network. The HFC network provides the workers with continuous connectivity to the Internet in that the HFC network is an "always on" mode. Many of the workers have web-based communication tools and video conferencing hardware to enhance the Internet experience.

There are many services for the Internet that alert a user who has enabled the service to be notified of the availability of other predefined users that have logged on to the Internet. The most widely known of these services include the Instant Messenger™ service from America Online®. However, a problem with the known services is that they do not take advantage of the assumption that broadband users will be using the services, and therefore have the infrastructure required to enable a plethora of communication tools (not available to the lower speed, low bandwidth users) that provide a close-to-natural communication experience.

What is needed is a method and system for facilitating interaction within communities of workers in the most natural setting possible. The needed system must provide each connected employee with the instant ability to achieve contact including effective face-to-face contact and tools that provide the instant feedback expected in communication.

DISCLOSURE OF INVENTION

Accordingly, it is an object of the present invention to provide a method and system that leverage the bandwidth in a hybrid fiber coax (HFC) communications network to provide services that address the social impacts related to managing and working with remote workers in an organization.

In carrying out the objects and other objects, the present invention provides a system and associated method for enabling a user to determine the status of other users and to identify communications methods for contacting the other users based on the status of the other users. The system includes a plurality of communications devices each associated with a user. Each of the communications devices is operable for the associated user to self assign a user status and communications procedures for contacting the associated user as a function of the user status. Each of the communications devices associated with a user is operable for displaying the user status of the other users. A hybrid fiber coax (HFC) communications network is operable with the communications device for providing continuous communications connectivity of a plurality of users with one another through an Internet.

Preferably, each of the communications devices associated with a user is operable for displaying the communications procedures associated with the other users for contacting the other users. The communication device associated with a user is operable with the HFC communications network and the communication device associated with another user for enabling the user to select a communication method from the communication methods associated with the another user and then establish a communication connection with the another user based on the selected communications procedure.

These and other objects, features, and advantages of the present invention will be readily apparent upon consideration of the following detailed description in conjunction with the accompanying drawings.

BRIEF DESCRIPTION OF DRAWINGS

FIG. 2 illustrates a user interface of the system of the present invention for enabling continuous communication with other users connected to the Internet, the user interface having information blocks describing the status of the other users connected to the Internet; and FIGS. 3A through 3D illustrate communication windows appearing in the desktop of the user upon selecting an information block associated with another user.

BEST MODE FOR CARRYING OUT THE INVENTION

Figure 1:
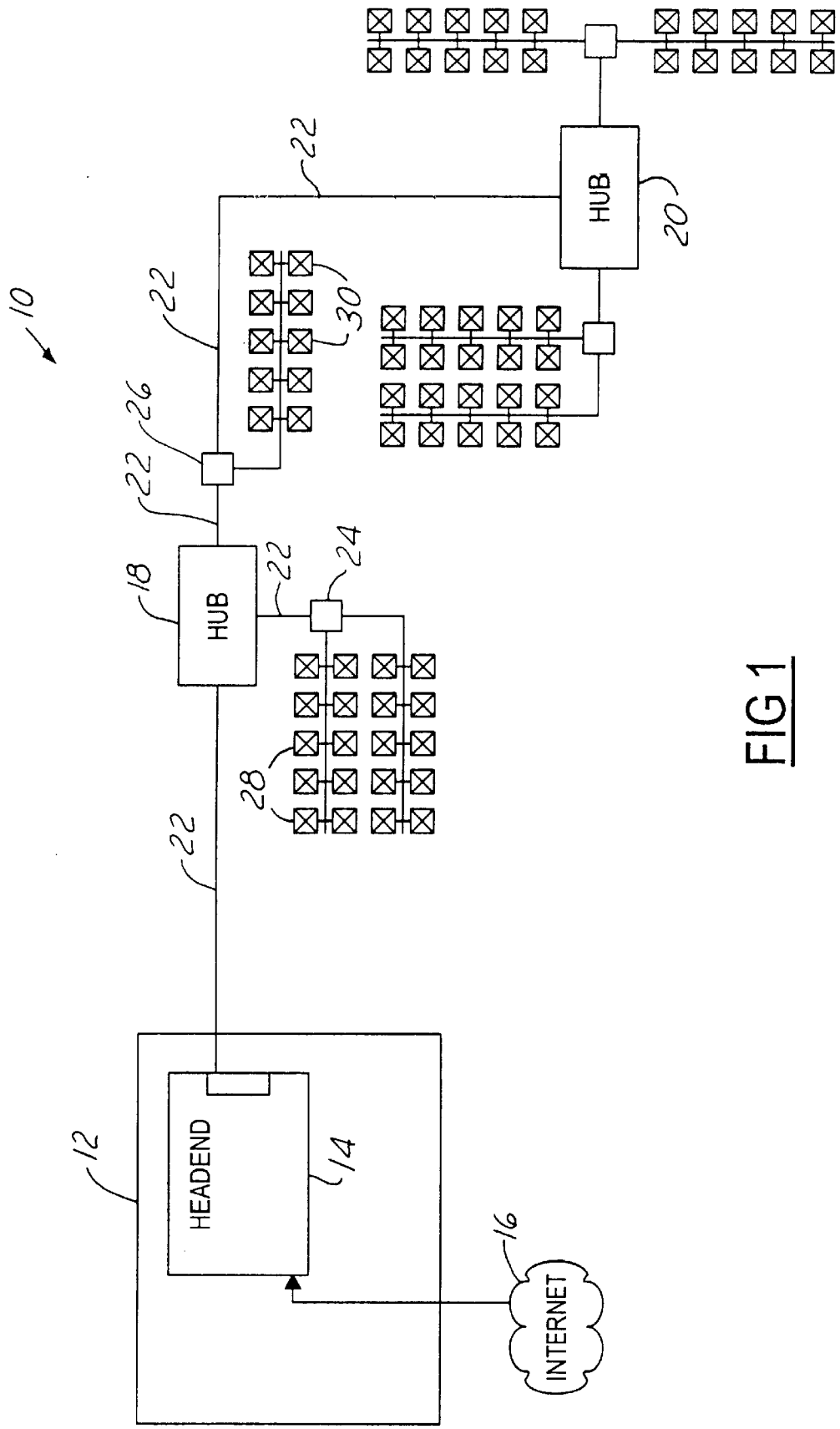
FIG. 1 illustrates a communications network for use with the present invention.

Referring now to FIG. 1, a communications network 10 for use with the present invention is shown. Communications network 10 includes a central office 12. A head end 14 is located at central office 12. Of course, depending on the size of the service area, it may be desirable to provide additional head ends. Head end 14 is connected with Internet 16 to receive and transmit information.

Head end 14 communicates with a plurality of hubs 18, 20. Preferably, distribution to hubs 18, 20 takes place over fiber 22. Hubs 18, 20 communicate with a plurality of nodes. Nodes are generally located in each neighborhood that is serviced. As shown, hub 18 communicates with nodes 24, 26. Optoelectronic conversion takes place at node 24, and the communication signals are then distributed over coax to serve a number of users 28. Node 26 distributes communication signals over coax to users 30.

Network 10 is a hybrid fiber coax (HFC) communications network. An HFC communications network is a communications network in which fiber is distributed from a central office to hubs, the fiber continuing to nodes in a neighborhood, and then the last leg of the communication path is performed over coax to each of the users in the neighborhood. By using coax for the last leg of the communication path, the existing coax drops in many neighborhoods may be used and the expense of laying new wire line in the neighborhood may be saved.

Network 10 provides continuous connectivity between Internet 16 and users 28, 30. Users 28, 30 have Internet browsers for accessing the Internet. An Internet browser translates signals from Internet 16 into pictures and text so that users 28, 30 can see them. An Internet browser moves a copy of documents on Internet 16 to the computers of users 28, 30. Typically, Internet browsers have plug-ins. Plug-ins are program modules that extend the Internet browser's ability to access different types of data. For instance, an Internet browser may have a plug-in that allows the users to hear sound or view videos downloaded from Internet 16. In addition to plug-ins, users 28, 30 may have hardware such as video conferencing hardware communicating videos to other users of Internet 16 to further enhance the Internet experience.

In general, users 28, 30 can access Internet 16 for information. Users 28, 30 may also use Internet 16 to communicate with one another such as by using electronic mail (email), instant messaging, Internet telephony, video conferencing, and the like. Because of the continuous connectivity provided by network 10 to Internet 16 the users are, in effect, continuously connected to one another.

Referring now to FIG. 2, one embodiment of a user interface of the system of the present invention for enabling continuous communication with other users connected to Internet 16 is shown. Each of the users has a communicating device such as a computer with an Internet browser for browsing Internet 16. Each of the users further has at least one Internet browser based plug-in for communicating with other users. FIG. 2 illustrates a user list window 32 that appears on the screen display, commonly called the "desktop", of a user or worker connected to Internet 16. On the desktop there are typically several windows including user list window 32. User list window 32 provides a visual mechanism for informing the user of the status of the other users or workers connected to Internet 16. User list window 32 includes user information blocks 34. User information blocks 34 are each associated with a respective user. Each user information block 34 includes the name and status of the associated user.

The status of the other users includes "Available", "Do not disturb", "Away from desk", "Out of Office", and the like. The user viewing user list window 32 can gain an understanding of the status of the other users from information blocks 34. The user can then select one of the information blocks 34 to see which actions are available for communicating with the associated user based on the status of that associated user. For instance, the user selects the information block 34 associated with John to learn how to contact John based on John's current status. In user list window 32 shown in FIG. 2 John's current status is "Available". Upon selecting information block 34 associated with John, a communication window appears in the user's desktop.

System 10 is configured such that each user connected to Internet 16 can self assign a status. For example, if a user is working and does not want to be disturbed then the user can self assign the status of "Do not disturb". If the user does not care about being interrupted then the user can self assign the status of "Available". Along with assigning a status of "Available" the user enters information in a communication window listing the communication methods that can be used for contacting the user. For example, if the user has a status of "Available" then the user can enter into a communication window the following communication methods for contacting the user: email, telephone, facsimile, instant chat, and video conferencing. The user may enter information associated with each communication method. For example, the user may associate an email address with the email communication method, a telephone number with the telephone communication method, and the like.

Referring now to FIGS. 3A through 3D, embodiments of communication windows appearing in the user's desktop are shown. FIG. 3A illustrates a communication window 36 appearing in a user's desktop upon the user selecting information block 34 associated with the user John in user list window 32. Communication window 36 includes the selected user's name 38, the status of the selected user 40, and communications actions 42 that are available for contacting the selected user. As mentioned above, John is available and the communication methods for contacting John include email, telephone, facsimile, instant chat, and video conferencing.

By viewing communication window 36 the user knows that it is alright to contact John and also knows how to contact him. System 10 may be configured to establish communication between the user and John depending upon the selected communication method. For instance, if the user selects the communication method of email or instant chat then system 10 establishes an email or instant chat connection between the user and John. Similarly, if the user selects telephone or facsimile then system 10 establishes a telephone or facsimile connection between the user and John.

The communication connections established between the user and John may be performed solely by system 10 or other communications hardware. For example, the telephone connection may be established by system 10 as an Internet telephony connection, or established by system 10 in conjunction with ordinary telephone equipment over the plain old telephone system (POTS), or the user may establish a telephone connection without using system 10. System 10 may also be configured such that upon selecting a communication methods the appropriate communication information is displayed on the user's desktop. For instance, if the user selects email then John's email address is displayed for the user or if the user selects telephone then John's telephone number is displayed for the user.

FIG. 3B illustrates a communication window 44 appearing in the user's desktop upon selecting an information block associated with the user John in user list window after John has changed his status to "Do not disturb". Communications window 44 includes communications actions 46 that may be taken to contact John based on his status of not wanting to be disturbed. Because John does not want to be disturbed he has not listed any communication methods as shown in FIG. 3B.

FIG. 3C illustrates a communication window 48 appearing in the user's desktop upon selecting an information block associated with the user John after John has changed his status to "Away from desk". Communications window 48 includes communication actions 50 that may be taken based on John's status of being away from his desk. Because John is away from his desk he has listed paging as communication method for contacting him. In response, the user may page John to contact him.

FIG. 3D illustrates a communications window 52 appearing in the user's desktop upon selecting an information block associated with the user John after John has changed his status to "Out of the office". Communications window 52 includes communication actions 54 that may be taken based on John's status of being out of the office. John has listed the communications actions of email, telephone, facsimile, and page. The user may select one of these communications procedures to contact John.

System 10 may be further configured such that filters may be employed to enable users to select which users may view their status information. Similarly, the filters may be employed to enable a user to select which users to view the status information. System 10 may also be configured to provide group activities such as chat rooms and conferencing.

Thus it is apparent that there has been provided, in accordance with the present invention, a system and associated method that leverage the bandwidth in a hybrid fiber coax (HFC) communications network to provide services that address the social impacts related to managing and working with remote workers in an organization. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for enabling a user to determine the status of other users and to identify and use communications procedures for contacting the other users based on the status of the other users, the system comprising:

a plurality of communications devices, each communications device being associated with a respective user, wherein each communications device is operable for the associated user to self assign one of at least first, second, and third user statuses during a contemporaneous time, and is further operable for the associated user to self assign communications procedures respectively for each of the at least first, second, and third user statuses, the communications procedures for the respective at least first, second, and third user statuses are available for other users to use in order to contact the associated user depending upon which one of the at least first, second, and third user statuses is assigned to the associated user, wherein each communications device is operable for displaying to the associated user the user status of each of the other users, and is further operable to display to the associated user the available communications procedures for contacting each of the other users; and a hybrid fiber coax (HFC) communications network operable with the communications devices for providing continuous communications connectivity of the users with one another through the Internet;

wherein the communication device associated with a user is operable with the HFC communications network and the communications devices associated with the other users for enabling the user to select a communications procedure from the available communications procedures associated with another user and then establish a communications connection with the another user using the selected communications procedure.

2. The system of claim 1 wherein:

the communications connection includes a telephone connection.

3. The system of claim 1 wherein:

the communications connection includes a facsimile communications connection.

4. The system of claim 1 wherein:

the communications connection includes a paging communications connection.

5. The system of claim 1 wherein:

the communications connection includes a video conferencing communications connection.

6. The system of claim 1 wherein:

the communications connection includes an electronic mail communications connection.

7. The system of claim 1 wherein:

the communications connection includes an instant messaging communications connection.

8. A method for enabling a user to determine the status of other users and to identify and use communications procedures for contacting the other users based on the status of the other users, the method comprising:

providing a plurality of communications devices with each communications device being associated with a respective user;

providing a hybrid fiber coax (HFC) communications network operable with the communications devices for providing continuous communications connectivity of the users with one another through the Internet;

using a communications device for the associated user to self assign one of at least first, second, and third user statuses during a contemporaneous time, and for the associated user to self assign communications procedures respectively for each of the at least first, second, and third user statuses, the communications procedures for the respective at least first, second, and third user statuses are available for other users to use in order to contact the associated user depending upon which one of the at least first, second, and third user statuses is assigned to the associated user;

displaying on the communications device for the associated user the user status of each of the other users, and the available communications procedures for contacting each of the other users;

using the communication device associated with a user to select a communications procedure from the available communications procedures associated with another user; and using the communication device associated with the user, the HFC communications network, and the communication device associated with the another user to establish a communication connection between the user and the another user the selected communications procedure.

9. The method of claim 8 wherein:

the communications connection is a telephone connection.

10. The method of claim 8 wherein:

the communications connection is a facsimile communications connection.

11. The method of claim 8 wherein:

the communications connection is a video conferencing communications connection.

12. The method of claim 8 wherein:

the communications connection is an electronic mail communications connection.

13. The method of claim 8 wherein:

the communications connection is an instant messaging communications connection.

14. The method of claim 8 wherein:

the communications connection is a paging communications connection.

* * * * *

UNITED STATES PATENT AND TRADEMARK OFFICE
CERTIFICATE OF CORRECTION

PATENT NO. : 6,678,719 B1
DATED : January 13, 2004
INVENTOR(S) : Carol L. Stimmel It is certified that error appears in the above-identified patent and that said Letters Patent is hereby corrected as shown below:

Column 6,
Line 44, before "the selected" insert -- using --.

Signed and Sealed this

Twenty-seventh Day of April, 2004

JON W. DUDAS
*Acting Director of the United States Patent and Trademark Office*